(12) United States Patent
Min et al.

(10) Patent No.: US 9,425,690 B2
(45) Date of Patent: Aug. 23, 2016

(54) CURRENT CONTROLLING MODE DIRECT CURRENT (DC)-DC CONVERTER

(71) Applicant: MagnaChip Semiconductor, Ltd., Cheongju-si (KR)

(72) Inventors: Jun Sik Min, Cheongju-si (KR); Hyoung Kyu Kim, Cheongju-si (KR)

(73) Assignee: Magnachip Semiconductor, Ltd., Cheongju-si (KR)

( * ) Notice: Subject to any disclaimer, the term of this patent is extended or adjusted under 35 U.S.C. 154(b) by 121 days.

(21) Appl. No.: 14/309,314

(22) Filed: Jun. 19, 2014

(65) Prior Publication Data

US 2015/0054482 A1    Feb. 26, 2015

(30) Foreign Application Priority Data

Aug. 23, 2013  (KR) .................. 10-2013-0100447

(51) Int. Cl.
*H02M 3/157* (2006.01)
*H02M 3/156* (2006.01)
*H02M 1/00* (2006.01)

(52) U.S. Cl.
CPC ...... *H02M 3/156* (2013.01); *H02M 2001/0032* (2013.01); *Y02B 70/16* (2013.01)

(58) Field of Classification Search
CPC ............... H02M 2001/0032; H02M 3/155; H02M 3/156; H02M 2001/0012; H02M 3/157
USPC .................. 323/282, 284, 285, 351, 283
See application file for complete search history.

(56) References Cited

U.S. PATENT DOCUMENTS 9,077,242 B2 *    7/2015    Causse .................. H02M 3/158

FOREIGN PATENT DOCUMENTS

KR    10-2009-0132497    12/2009

* cited by examiner

*Primary Examiner* — Gary L Laxton

(57) ABSTRACT

There is provided a current controlling mode DC-DC converter that operates in a PWM mode or a PFM mode by adjusting a turned-on time of a gate depending on power consumption of a load. The DC-DC converter includes a first comparator that receives a first input voltage and a second input voltage and outputs a first output signal, a second comparator that receives a reference voltage for mode switching and the second input voltage and outputs a second output signal, and a first logic element that outputs a reset signal for turning off a gate at a point of time when both the first output signal and the second output signal are applied. Examples may also include additional elements to facilitate mode switching.

20 Claims, 3 Drawing Sheets

CURRENT CONTROLLING MODE DIRECT CURRENT (DC)-DC CONVERTER

CROSS-REFERENCE TO RELATED APPLICATIONS

This application claims the benefit under 35 U.S.C. §119 (a) of Korean Patent Application No. 10-2013-0100447 filed on Aug. 23, 2013, in the Korean Intellectual Property Office, the entire disclosure of which is incorporated herein by reference for all purposes.

BACKGROUND OF THE INVENTION

1. Field

The following description relates to a current controlling mode direct current (DC)-DC converter. The following description also relates to a current controlling mode DC-DC converter that is controlled to operate in a Pulse Width Modulation (PWM) operation mode or a Pulse Frequency Modulation (PFM) operation mode depending on power consumption of a load.

2. Description of Related Art

A DC-DC converter is classified into a Pulse Width Modulation (PWM) mode and a Pulse Frequency Modulation (PFM) mode according to a controlling mode in which the DC-DC converter operates.

The PWM controlling mode is a more general mode for switch control. This mode controls a switch to be repeatedly turned on or off by being synchronized with a clock signal that has a constant cycle. Accordingly, because it is possible to stabilize output voltage to a desired voltage value, the PWM controlling mode maintains an output voltage in a large load condition. However, in the PWM controlling mode, since the switching is performed every cycle, power loss caused by the switching performed every cycle may be relatively large with respect to power consumption at an output load. Thus, when the PWM controlling mode is applied to the DC-DC converter having a small load, there is an issue that efficiency of the DC-DC converter is degraded.

Meanwhile, the PFM controlling mode is another mode that operates the switch only when needed. Thus, such a mode operates without constantly synchronizing a turned-on or turned-off state of the switch with the clock signal. Accordingly, the PFM controlling mode may improve conversion efficiency in such a DC-DC converter having a small load. However, the PFM mode presents the issue that an output ripple is relatively higher than that in the PWM controlling mode.

As stated above, the PWM controlling mode and the PFM controlling mode each have complementary strengths and weaknesses. Thus, the PWM controlling mode and the PFM controlling mode may be used together depending on a change in a load in various electronic devices in which efficiency of the DC-DC converter is a significant issue. For example, when a size of the load is divided into a heavy load and a light load, by driving the DC-DC converter in the PWM controlling mode in the heavy load and by driving in the PFM controlling mode in the light load, the DC-DC converter operates with high efficiency regardless of the load.

An example of such a DC-DC converter, illustrated in FIG. 1, includes a configuration of a DC-DC converter that has a PWM controlling mode and a PFM controlling mode and is driven in the PFM mode when a small amount of current flows in a load.

However, as shown in FIG. 1, the DC-DC converter illustrated in FIG. 1 has a configuration in which the converter is switched between operating in the PWM controlling mode and operating in the PFM controlling mode by an operation of a conversion switch based on a conversion controlling signal (CNT). In this example, there is an issue that a control signal is used to switch from one mode to the other.

As another example, there may be provided a load detecting circuit so as to control operating the DC-DC converter in the PWM operation mode or in the PFM operation mode depending on a size of the load. Thus, this example corresponds to a case in which the load detecting circuit is connected to an output terminal. However, in this case, there is an issue that the entire circuit configuration is made more complicated due to the integration of the load detecting circuit into the entire circuit.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In order to address the above-mentioned issues, examples provide a current controlling mode direct current (DC)-DC converter with which it is possible to select between operating in a PWM operation mode and a PFM operation mode by using an output feedback signal. However, examples select between PWM and PFM operation modes without having a circuit for detecting a control signal or a load.

Furthermore, examples also provide a high-efficiency current controlling mode DC-DC converter capable of reducing switching loss.

In one general aspect, a DC-DC converter, includes a first comparator configured to receive a first input voltage I and a second input voltage and to output a first output signal, a second comparator configured to receive a reference voltage for mode switching and the second input voltage and to output a second output signal, and a logic element for reset signal output configured to output a reset signal by turning off a gate at a point of time when both the first output signal and the second output signal are applied to the logic element.

The first input voltage may be an output voltage of an error amplifier.

The inputs of the error amplifier may be a reference voltage for controlling a feedback voltage.

The second input voltage may be a combined signal of a sensing signal and a ramp signal.

The DC-DC converter may further include an inverter configured to invert the first output signal, a logic element for set signal output configured to receive a clock signal and an output signal of the inverter and to output a set signal, and an Set-Reset (SR) latch configured to receive the reset signal or the set signal and configured to generate a waveform in which an on-time section of the gate has been adjusted.

The logic element for reset signal output and the logic element for set signal output may be AND gates.

The reference voltage may be a minimum on-time value of the gate that enables the DC-DC converter to operate in a Pulse Width Modulation (PWM) mode.

The DC-DC converter may operate in a Pulse Width Modulation (PWM) mode in a section of gate operation in which the first input voltage is larger than the reference voltage.

In the PWM mode, the first output signal may be generated later than the second output signal.

When the first input voltage is decreased in the PWM mode, the on-time section of the gate may become narrower.

When the first input voltage is decreased in the PWM mode, a width of the second output signal may become narrower.

The DC-DC converter may operate in a Pulse Frequency Modulation (PFM) mode in a section of gate operation in which the first input voltage is smaller than the reference voltage.

In the PFM mode, the first output signal may be generated earlier than the second output signal.

In the PFM mode, the on-time section of the gate may be constant.

The gate may be maintained in a turned-off state in a section in which the first input voltage is smaller than an initial voltage of the second input voltage.

The DC-DC converter may change from Pulse Width Modulation (PWM) mode to Pulse Frequency Modulation (PFM) mode or from PFM mode to PWM mode in a section of gate operation in which the first input voltage is equal to the reference voltage.

In another general aspect, a DC-DC converter includes a first comparator configured to receive a first input voltage and a second input signal and to output a first output voltage; and a second comparator configured to receive a reference value for mode switching and the second input signal and to output a second output signal, wherein the DC-DC converter switches between modes by outputting a reset signal for a gate at a point in time at which both the first output signal and the second output signals are applied, and wherein the DC-DC converter changes from Pulse Width Modulation (PWM) mode to Pulse Frequency Modulation (PFM) mode or from PFM mode to PWM mode in a section of gate operation in which the first input voltage is equal to the reference voltage.

The first input voltage may be an output voltage of an error amplifier.

The inputs of the error amplifier may be a reference voltage for controlling a feedback voltage.

The second input voltage may be a combined signal of a sensing signal and a ramp signal.

The DC-DC converter operates in a Pulse Width Modulation (PWM) mode in a section of gate operation in which the first input voltage is larger than the reference voltage and operates in a Pulse Frequency Modulation (PFM) mode in a section of gate operation in which the first input voltage is smaller than the reference voltage.

Other features and aspects will be apparent from the following detailed description, the drawings, and the claims.

Figure 1:
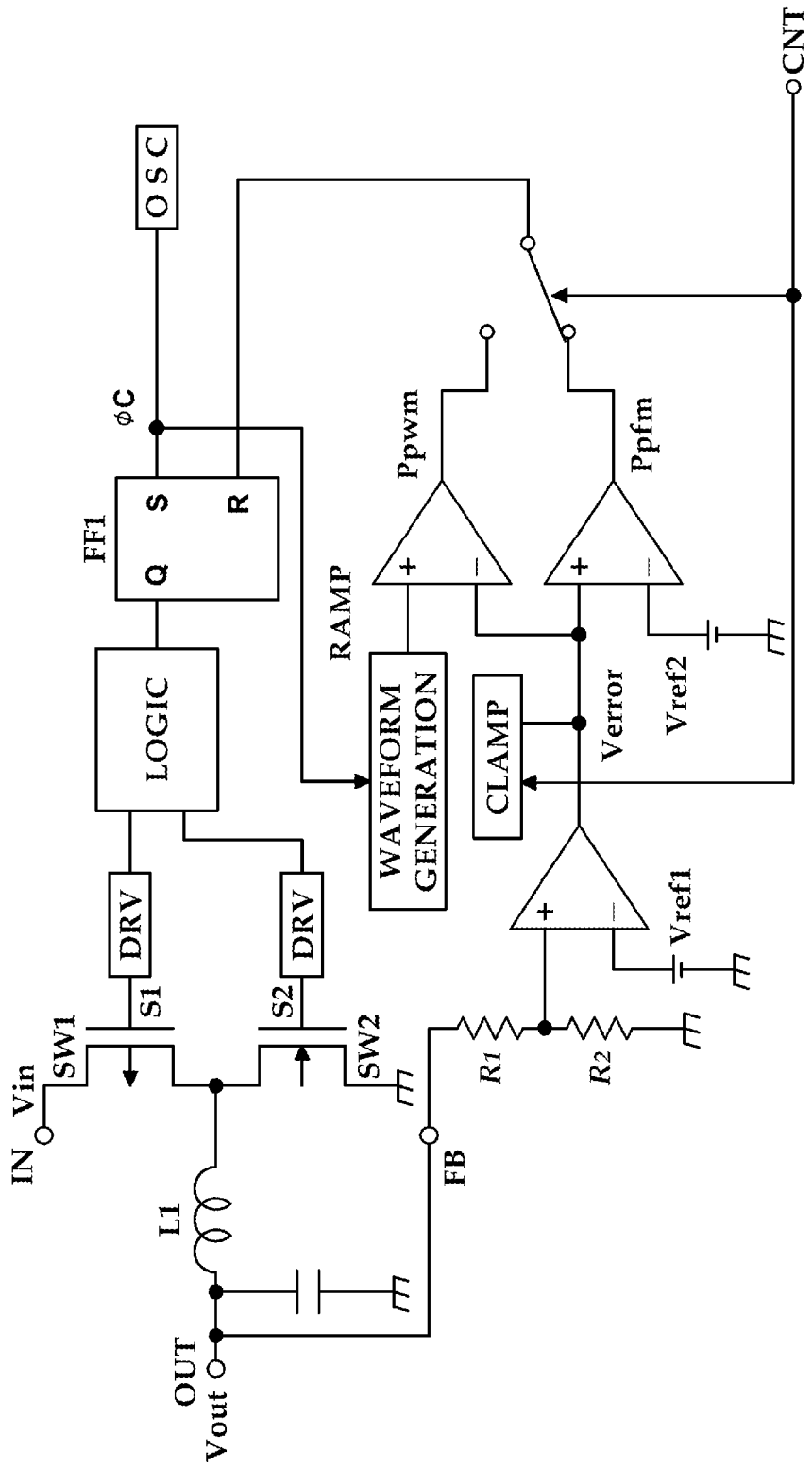
FIG. 1 is a circuit configuration diagram of a DC-DC converter according to related art.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

As set forth above, according to examples, a circuit includes comparators and logic elements for adjusting a turned-on time (or a turned-off time) of a gate in order to drive the DC-DC converter in a PWM mode or a PFM mode. Therefore, such a circuit has the capability to provide a current controlling mode DC-DC converter that reduces switching loss with high efficiency while switching the PWM mode or the PFM mode depending on power consumption of a load. However, the example circuits are able to perform such switching without having a separate circuit for detecting a control signal or a load.

Examples provide for a high-efficiency current controlling mode DC-DC converter with the feature that the converter operates in a PWM mode or a PFM mode depending on power consumption of a load. The DC-DC converter of examples includes elements for adjusting a turned-on time and/or a turned-off time of a gate in order to drive the current controlling mode DC-DC converter in the PWM mode or the PFM mode to provide for improved efficiency.

A current controlling mode DC-DC converter according to examples for providing the above-mentioned feature of switching modes in an advantageous way is explained with reference to the accompanying drawings.

Figure 2:
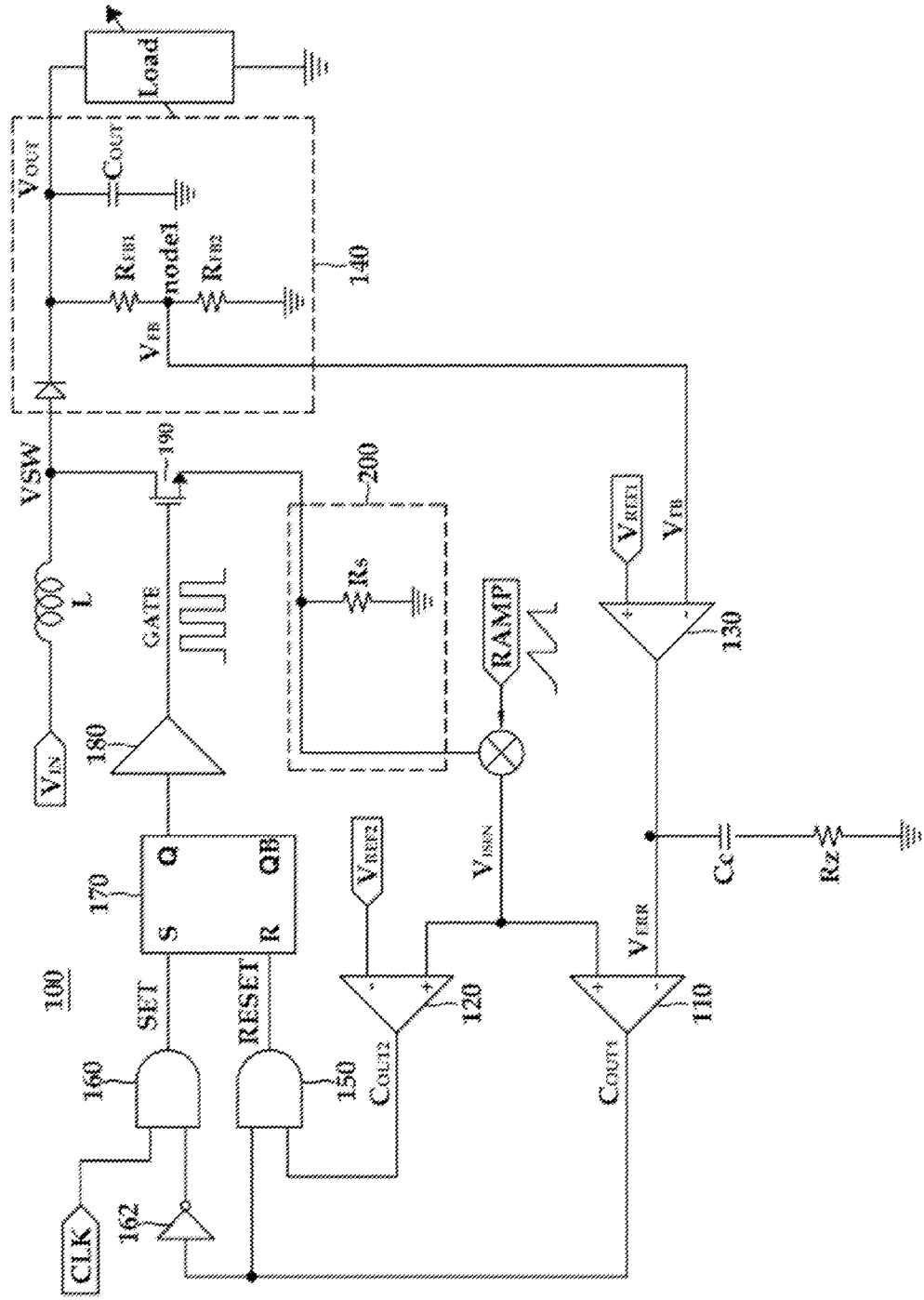
FIG. 2 is a circuit configuration diagram of a current controlling mode DC-DC converter according to an example.

FIG. 2 is a circuit configuration diagram of a current controlling mode DC-DC converter according to an example.

As shown in FIG. 2, a current controlling mode DC-DC converter 100 includes a first comparator 110 and a second comparator 120. In the example, the first comparator 110 is related to a PWM mode, and the second comparator 120 is related to a PFM mode.

The first comparator 110 receives a $V_{ISEN}$ voltage through a non-inverting terminal (+) and receives a $V_{ERR}$ voltage through an inverting terminal (−). Further, the first comparator 110 outputs a first output signal $C_{OUT1}$ based on the $V_{ISEN}$ voltage and $V_{ERR}$ voltage. The first output signal $C_{OUT1}$ is related to the PWM mode. The $V_{ISEN}$ voltage is a combined signal of a sensing signal and a ramp signal. Here, the sensing signal is a value obtained by sensing a current value flowing in an inductor or, alternatively, a power switch, provided in the DC-DC converter of the present example which operates in a current controlling mode. The ramp signal is a signal for slope compensation that is output from a non-illustrated ramp circuit. Such a ramp circuit generates an output voltage up to a specific value, called a ramp. Such an output voltage potentially helps avoid jolts when changing a load.

Moreover, the $V_{ERR}$ voltage is an output signal of an error amplifier 130. In FIG. 2, the error amplifier 130 is connected to the inverting terminal (−) of the first comparator 110, as discussed above. The error amplifier 130 receives a first reference voltage $V_{REF1}$ through a non-inverting terminal (+) and receives a feedback voltage transmitted from an output module 140 of the DC-DC converter through an inverting terminal (−). The inverting terminal (−) through which the feedback voltage is received is directly connected to a node1 between feedback resistors $R_{FB1}$ and $R_{FB2}$ of the output module 140.

Meanwhile, the first reference voltage $V_{REF1}$ is a reference value that is used for controlling the feedback voltage $V_{FB}$. An output voltage $V_{OUT}$ is determined by operating the DC-DC converter such that the feedback voltage $V_{FB}$ becomes the same as the first reference voltage $V_{REF1}$. In addition, a capacitor Cc and a resistor Rz for frequency compensation are connected in parallel between the first comparator 110 and the error amplifier 130.

The second comparator 120 receives the $V_{ISEN}$ voltage through a non-inverting terminal (+) and receives a second reference voltage $V_{REF2}$ through an inverting terminal (−). The second comparator outputs a second output signal $C_{OUT2}$, based on the $V_{ISEN}$ voltage and on the second reference voltage $V_{REF2}$, related to the PFM mode. The second reference voltage $V_{REF2}$ is a value that is compared with the $V_{ISEN}$ voltage. Additionally, the second reference voltage $V_{REF2}$ determines minimum on-time of a gate to allow the DC-DC converter 100 to operate in the PFM mode. The determined minimum on-time is a value that substantially determines the operation of the PWM mode and the PFM mode and is related to a width at which the gate is maintained in a turned-on state. Thus, in the following description, the minimum on-time is referred to as a minimum width. The second reference voltage $V_{REF2}$ is typically applied as an optimum value depending on the purpose of use in consideration of controlling performance and efficiency of the DC-DC converter 100.

The DC-DC converter also includes a first logic element 150 that serves as a logic element for a reset signal output. The first logic element 150 receives directly as inputs the first output signal $C_{OUT1}$ and the second output signal $C_{OUT2}$. Furthermore, the DC-DC converter includes a second logic element 160 that serves as a logic element for a set signal output. The second logic element 160 receives a clock signal and the first output signal $C_{OUT1}$ inverted through an inverter 162. In the example of FIG. 2, AND gates are used as both the first logic element 150 and the second logic element 160.

The DC-DC converter further includes a Set-Reset (SR) latch 170 that receives a logic signal of the first logic element 150 through a RESET terminal and receives a logic signal of the second logic element 160 through a SET terminal. The output of the SR latch 170 is connected to a power switch 190 serving as an n-channel MOSFET (NMOS) transistor, through a driver 180. Further, the SR latch 170 generates a square wave for a gate node based on the first logic element 150 and the second logic element 160. When the SR latch 170 is reset by the first logic element 150 and the second logic element 160, a gate signal is turned off. When the SR latch is set by the first and second logic elements, the gate signal is turned on.

Meanwhile, the DC-DC converter 100 further includes a sensing module 200. The sensing module 200 is directly connected to a source of the power switch 190 so as to sense a current value flowing in the power switch 190 connected to the output of the SR latch 170. A resistor $R_S$ for adjusting a sensing current is included in the sensing module 200. One end of the resistor $R_S$ is grounded. Furthermore, an input terminal $V_{IN}$ and an inductor L are connected to a drain of the power switch 190. Also, the output module 140 is connected to a load. The output module 140 includes the feedback resistors $R_{FB1}$ and $R_{FB2}$ and also an output capacitor $C_{OUT}$.

Next, a method of controlling an operation mode of the DC-DC converter having the above-described configuration is described.

Figure 3:
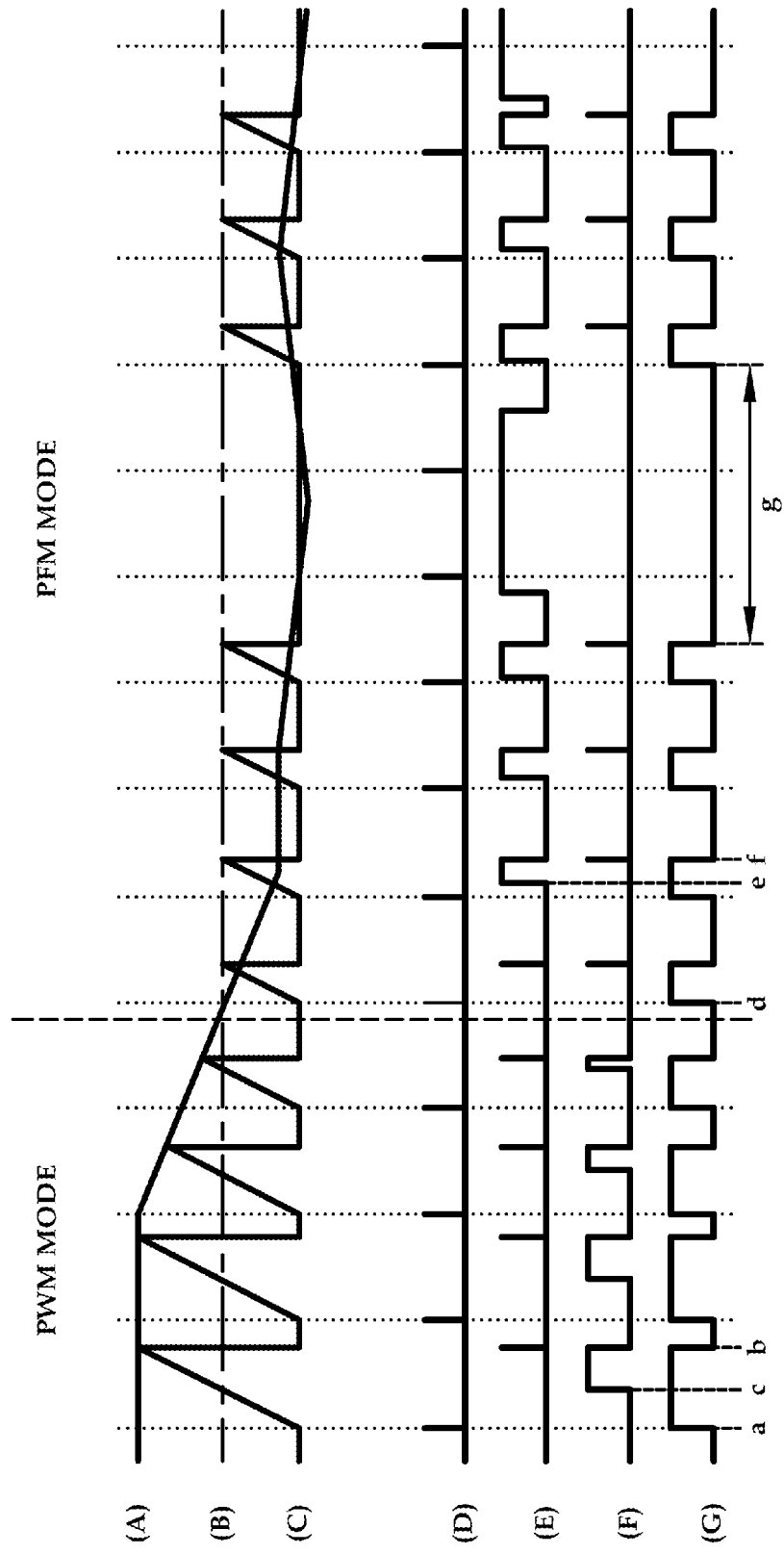
FIG. 3 is a timing chart for describing an operation mode of the current controlling mode DC-DC converter shown in FIG. 2.

This method is described with reference to FIG. 3. FIG. 3 is a timing chart illustrating the operational modes of the DC-DC converter of the examples. In FIG. 3, (A) represents the $V_{ERR}$ voltage, (B) represents the second reference voltage $V_{REF2}$, (C) represents the $V_{ISEN}$ voltage, (D) represents the clock signal, (E) represents the first output signal $C_{OUT1}$, (F) represents the second output signal $C_{OUT2}$, and (G) represents the gate square wave. The signals are represented in FIG. 3 so as to show the overall shape that these different signals assume over time, rather than being limited to specific values of the signals.

First, a power input is applied to the DC-DC converter 100. Thus, the SR latch 170 enters a set state. This occurs because the second logic element 160 transmits, to the SR latch 170, the clock signal in a high state and the first output signal $C_{OUT1}$, which begins in a high state because it is inverted by the inverter 162. Thus, the gate is turned on. The first output signal $C_{OUT1}$ and the second output signal $C_{OUT2}$ of the first comparator 110 and the second comparator 120 are not yet output at a point of time a when the gate is turned on.

As described above, when a power begins to be applied to the DC-DC converter 100, the error amplifier 130 simultaneously compares the first reference voltage $V_{REF1}$ with the feedback voltage $V_{FB}$ and also outputs the $V_{ERR}$ voltage as the output signal. Further, the $V_{ISEN}$ voltage that is generated by combining the current value sensed by the sensing module 200 and the ramp signal is output as well.

In such a state, a case in which a load condition requires a width that is larger than the minimum width of the gate is first described. Such a case is a case in which a heavy load is connected to the load.

As stated above, in the case of being connected to the heavy load, a large amount of power is transmitted to the load. In other words, in such a case, a duration corresponding to a section in which the gate is maintained in a turned-on state needs to increase. Accordingly, the first output signal $C_{OUT1}$ for turning off the gate needs to be output later.

However, in the case of being connected to the heavy load, the $V_{ERR}$ voltage related to the feedback voltage also assumes a high voltage value. By contrast, since the $V_{ISEN}$ voltage is related to the current sensing, the $V_{ISEN}$ voltage starts to increase from a certain initial value from a point of time at which the gate is turned on. Thus, the first comparator 110 that receives the $V_{ERR}$ voltage and the $V_{ISEN}$ voltage outputs the first output signal $C_{OUT1}$ in a high level state at a point of time b at which the $V_{ISEN}$ voltage reaches the $V_{ERR}$ voltage.

Furthermore, the first output signal $C_{OUT1}$ is applied to the first logic element 150. By contrast, since the $V_{ISEN}$ voltage is higher than the second reference voltage $V_{REF2}$, the second output signal $C_{OUT2}$ is output in a high level state before the first output signal $C_{OUT1}$ is output in a high level state, at a point of time c. Accordingly, the first logic element 150 outputs a reset signal to turn off the gate at a point of time when the first output signal $C_{OUT1}$ is generated.

In other words, the gate is turned on by the set signal, and the gate is maintained in the turned-on state until the point of time b when the first output signal $C_{OUT1}$ is applied to the first logic element 150.

The time for maintaining the turned-on state of the gate during one cycle is reduced along with a decrease in the $V_{ERR}$ voltage and a change in the output of the first output signal $C_{OUT1}$ that has been compared with the $V_{ISEN}$ voltage and then output.

In this way, in the case of being connected to the heavy load, the DC-DC converter 100 operates in the PWM operation mode, in which the turned-on time of the gate is maintained until the point of time b when the first output signal $C_{OUT1}$ is generated.

Meanwhile, an alternative case where the $V_{ERR}$ voltage is further decreased to allow the load condition to become the PFM operation mode is now described. For example, this case corresponds to a case in which the load is changed from a heavy load to a light load. As examples, such a case corresponds to a case in which an electronic instrument is changed from a normal state to a standby state, or a case in which only a partial function of the entire function of the electronic instrument is operated. As stated above, the change of the load from the heavy load to the light load occurs at a point of time when the $V_{ERR}$ voltage is equal to or less than the second reference voltage $V_{REF2}$, as shown in FIG. 3. In this manner, when the $V_{ERR}$ voltage is equal to or less than the second reference voltage $V_{REF2}$, only a power that is relatively smaller than the heavy load is needed, so that a duration corresponding to a section in which the gate is turned on is decreased.

The PFM operation mode is operated as follows.

First, when the clock signal is applied, since the clock signal in the high state and the first output signal $C_{OUT1}$, which is in the high state because it is inverted by the inverter 162, are transmitted to the SR latch 170, and the gate of the second logic element 160 is turned on, which occurs at a point of time d.

When the gate is turned on, the $V_{ISEN}$ voltage begins to increase from a certain initial value. Then, the first comparator 110 compares the $V_{ISEN}$ voltage with the $V_{ERR}$ voltage and outputs the first output signal $C_{OUT1}$ in a high level state. The first output signal $C_{OUT1}$ is then transmitted to the first logic element 150.

At this time, the second comparator 120 compares the second reference voltage $V_{REF2}$ and the $V_{ISEN}$ voltage and outputs the second output signal $C_{OUT2}$ in a high level state. However, even when the $V_{ERR}$ voltage is decreased and the first output signal $C_{OUT1}$ is output as described above, occurring at a point of time e, the second output signal $C_{OUT2}$ is output in the high level state later than the first output signal, occurring at a point of time f. Accordingly, since the first output signal $C_{OUT1}$ is already applied to the first logic element 150, the second output signal $C_{OUT2}$ is applied later than the first output signal to the first logic element 150.

Accordingly, the first logic element 150 generates the reset signal, in this example, at a point of time when the second output signal $C_{OUT2}$ is applied, and the SR latch 170 is reset by the reset signal. Therefore, the gate is turned off.

In this manner, since the gate is turned on by the clock signal in the PFM operation mode and is turned off at the point of time when the second output signal $C_{OUT2}$ is applied to the first logic element 150, the turned-on section of the gate is constantly maintained. That is, the duration of the turned-on maintained section is not reduced. The turned-on section of the gate corresponds to the minimum width at which the DC-DC converter 100 operates in the PFM operation mode.

Meanwhile, a case where a $V_{ERR}$ voltage is continuously decreased to a value even smaller than the certain initial value of the $V_{ISEN}$ voltage may occur (section g). In other words, the section g is a section in which the DC-DC converter 100 does not perform a booster function. However, in the light load condition, sufficient voltage $V_{OUT}$ is output by only driving the DC-DC converter at the minimum width of the PFM operation mode, and thereby such time in which output voltage $V_{OUT}$ is decreased is allowed. Accordingly, the function of booster can be obtained with respect to the converter.

In this state, the first output signal $C_{OUT1}$ is continuously maintained at the high level, and the second output signal $C_{OUT2}$ has a low level. Accordingly, the gate is continuously maintained in the turned-off state during which the first output signal $C_{OUT1}$ is maintained in the high-level state. That is, the gate is prevented from being turned on.

Thereafter, when the output voltage $V_{OUT}$ is decreased, the feedback voltage $V_{FB}$ is less than the first reference voltage $V_{REF1}$, and the $V_{ERR}$ voltage of the error amplifier 130 is increased again to perform a booster function, and the gate is operated again. Thereafter, when the load is changed to the heavy load condition, since a large amount of power is to be transmitted to the load as described above, the PWM mode for increasing the turned-on maintained section of the gate is executed again.

In this way, the examples provide a set of features in which, since the current controlling mode DC-DC converter includes a circuit for an operation mode having only the comparators and the logic elements, instead of a circuit for detecting a control signal or a load, it becomes possible to drive the DC-DC converter in the PWM mode and the PFM mode depending on a size of the load while reducing switching loss.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a hardware component may include multiple processors or a processor and a controller. In addition, different processing configurations are possible, such as parallel processors.

The methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The media may also include, alone or in combination with the software program instructions, data files, data structures, and the like. The non-transitory computer readable recording medium may include any data storage device that can store data that can be thereafter read by a computer system or processing device.

Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

As a non-exhaustive illustration only, a terminal/device/unit described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blu-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

A computing system or a computer may include a microprocessor that is electrically connected to a bus, a user interface, and a memory controller, and may further include a flash memory device. The flash memory device may store N-bit data via the memory controller. The N-bit data may be data that has been processed and/or is to be processed by the microprocessor, and N may be an integer equal to or greater than 1. If the computing system or computer is a mobile device, a battery may be provided to supply power to operate the computing system or computer. It will be apparent to one of ordinary skill in the art that the computing system or computer may further include an application chipset, a camera image processor, a mobile Dynamic Random Access Memory (DRAM), and any other device known to one of ordinary skill in the art to be included in a computing system or computer. The memory controller and the flash memory device may constitute a solid-state drive or disk (SSD) that uses a non-volatile memory to store data.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A direct current (DC)-DC converter, comprising:
   a first comparator configured to receive a first input voltage and a second input voltage and to output a first output signal;
   a second comparator configured to receive a reference voltage configured to indicate mode switching and the second input voltage and to output a second output signal, wherein the second input voltage is based on a sensing signal and a ramp signal; and
   a first logic element configured to output a reset signal based upon a determination that both the first output signal and the second output signal are applied to the first logic element, wherein the reset signal is configured to turn off a gate.

2. The DC-DC converter of claim 1, wherein the first input voltage comprises an output voltage of an error amplifier.

3. The DC-DC converter of claim 2, wherein the inputs of the error amplifier comprise a reference voltage for controlling a feedback voltage.

4. The DC-DC converter of claim 1, further comprising:
   an inverter configured to invert the first output signal;
   a second logic element configured to receive a clock signal and an output signal of the inverter and to output a set signal; and
   an Set-Reset (SR) latch configured to receive the reset signal or the set signal and configured to generate a waveform in which an on-time section of the gate has been adjusted.

5. The DC-DC converter of claim 4, wherein the first logic configured to output the reset signal and the second logic element configured to output the set signal are AND gates.

6. The DC-DC converter of claim 4, wherein the reference comprises a minimum on-time value of the gate that enables the DC-DC converter to operate in a Pulse Width Modulation (PWM) mode.

7. The DC-DC converter of claim 4, wherein the DC-DC converter operates in a Pulse Width Modulation (PWM) mode in a section of gate operation in which the first input voltage is larger than the reference voltage.

8. The DC-DC converter of claim 7, wherein in the PWM mode, the first output signal is generated later than the second output signal.

9. The DC-DC converter of claim 7, wherein the on-time section of the gate becomes narrower based on a decrease in the first input voltage in the PWM mode.

10. The DC-DC converter of claim 7, wherein a width of the second output signal becomes narrower based on a decrease in the first input voltage in the PWM mode.

11. The DC-DC converter of claim 4, wherein the DC-DC converter operates in a Pulse Frequency Modulation (PFM) mode in a section of gate operation in which the first input voltage is smaller than the reference voltage.

12. The DC-DC converter of claim 11, wherein in the PFM mode, the first output signal is generated earlier than the second output signal.

13. The DC-DC converter of claim 11, herein in the PFM mode, the on-time section of the gate is constant.

14. The DC-DC converter of claim 11, wherein the gate is maintained in a turned-off state in a section in which the first input voltage is smaller than an initial voltage of the second input voltage.

15. The DC-DC converter of claim 4, wherein the DC-DC converter changes from Pulse Width Modulation (PWM) mode to Pulse Frequency Modulation (PFM) mode or from PFM mode to PWM mode in a section of gate operation in which the first input voltage is equal to the reference voltage.

16. A direct current (DC)-DC converter, comprising:
- a first comparator configured to receive a first input voltage and a second input voltage and to output a first output signal;
- a second comparator configured to receive a reference voltage for mode switching and the second input voltage and to output a second output signal;
- a first logic element configured to output a reset signal based upon a determination that both the first output signal and the second output signal are applied to the first logic element, wherein the reset signal is configured to turn off a gate; and
- a second logic element configured to output a set signal based upon a determination that a clock signal and an inverted first output signal are applied to the second logic element, wherein the set signal is configured to turn on the gate,
- wherein the DC-DC converter switches between modes by outputting a reset signal for a gate at a point in time at which both the first output signal and the second output signals are applied, and wherein the DC-DC converter changes from Pulse Width Modulation (PWM) mode to Pulse Frequency Modulation (PFM) mode or from PFM mode to PWM mode in a section of gate operation in which the first input voltage is equal to the reference voltage.

17. The DC-DC converter of claim 16, wherein the first input voltage comprises an output voltage of an error amplifier.

18. The DC-DC converter of claim 17, wherein the inputs of the error amplifier comprise a reference voltage for controlling a feedback voltage.

19. The DC-DC converter of claim 16, wherein the second input voltage comprises a combined signal of a sensing signal and a ramp signal.

20. The DC-DC converter of claim 16, wherein the DC-DC converter operates in a Pulse Width Modulation (PWM) mode in a section of gate operation in which the first input voltage is larger than the reference voltage and operates in a Pulse Frequency Modulation (PFM) mode in a section of gate operation in which the first input voltage is smaller than the reference voltage.

* * * * *